United States Patent

Ichikawa

[11] Patent Number: 5,805,323
[45] Date of Patent: Sep. 8, 1998

[54] OPTICAL SCANNING APPARATUS

[75] Inventor: Junichi Ichikawa, Ebina, Japan

[73] Assignee: Fuji Xerox Co., Ltd., Japan

[21] Appl. No.: 801,412

[22] Filed: Feb. 20, 1997

[30] Foreign Application Priority Data

Feb. 21, 1996  [JP]  Japan .................................... 8-033713

[51] Int. Cl.$^6$ ................................................. G02B 26/08
[52] U.S. Cl. ........................ 359/205; 359/206; 359/207; 359/208; 359/216
[58] Field of Search .................................. 359/205–208, 359/216–219; 347/256–261

[56] References Cited

U.S. PATENT DOCUMENTS

| | | | |
|---|---|---|---|
| 4,984,858 | 1/1991 | Kuroda | 359/208 |
| 5,408,095 | 4/1995 | Atsuumi et al. | 359/208 |
| 5,572,353 | 11/1996 | Iizuka et al. | 359/207 |

FOREIGN PATENT DOCUMENTS

| | | |
|---|---|---|
| 61-172109 | 8/1986 | Japan . |
| 6-18803 | 1/1994 | Japan . |

*Primary Examiner*—James Phan
*Attorney, Agent, or Firm*—Finnegan, Henderson, Farabow, Garrett, & Dunner, L.L.P.

[57] ABSTRACT

An optical scanning apparatus comprises a first image formation optical system for shaping a diameter of a light beam emitted from a light source, deflection means for deflecting an incident light beam at a constant angular velocity, a second image formation optical system for forming the image with the light beam deflected by the deflection means on a surface to be scanned, and a third image formation optical system for forming the image with the light beam deflected by the deflection means on the surface to be scanned, wherein a locational relationship between the first image formation optical system and the deflection means is set so that the light beam can be incident on the deflection means in such a manner that the center of a flux of light of the light beam from the light source forms a predetermined angle relative to an axis perpendicular to a rotating axis of the deflection means, and the third image formation optical system is disposed in such a manner that the distortion of the scanning line formed on the third image formation optical system due to the incidence of the light beam on the deflection means at the predetermined angle can correct the curvature of field in the direction of the auxiliary scan in a width of the scan on the surface to be scanned or the curvature of the conjugating point relative to the reflecting surfaces of the deflection means.

16 Claims, 10 Drawing Sheets

POSITION OF THE IMAGE FORMATION

POSITION OF THE IMAGE FORMATION

POSITION OF THE IMAGE FORMATION

OPTICAL SCANNING APPARATUS

BACKGROUND OF THE INVENTION

1. Field of the Invention

The present invention relates to an optical scanning apparatus provided for an image forming apparatus such as a copier, a laser printer or the like for scanning a laser beam so as to carry out the recording, display and reading of the image, and the like. More specifically, the invention relates to the optical scanning apparatus in which a curvature of field in a direction of an auxiliary scan or a surface tilting of an optical deflector is corrected.

2. Description of the Related Art

Heretofore, as an optical scanning apparatus applied to a laser printer and a digital copier, methods disclosed in Japanese Patent Application Laid-open No. 61-172109 and Japanese Patent Application Laid-open No. 6-18803 are well known. A construction of the optical scanning apparatus disclosed in Japanese Patent Application Laid-open No. 6-18803 is shown in FIG. 10.

As shown in FIG. 10, a conventional optical scanning apparatus comprises a photo-sensitive body drum 131 (a surface to be scanned), a semiconductor laser 121 disposed in a box (not shown) having a dust-proof construction, a collimator lens 122 for generally collimating a light diverged from the semiconductor laser 121, a slit 123 for regulating a condition that a flux of laser light is focused on the photo-sensitive body drum 131, a rotating polygon mirror 126 (corresponding to an optical deflector) provided with reflecting surfaces 126A for deflecting the flux of laser light modulated in response to an image information within the range of a predetermined scanning angle, a cylindrical lens 124 (corresponding to a first image formation optical system described below) for forming a linear image with the flux of laser light near the rotating polygon mirror 126, a reflecting mirror 125, an f θ lens 127 (corresponding to a second image formation optical system described below) for correcting a scanning speed of the flux of laser light which is deflected and scanned by the rotating polygon mirror 126 and for forming the image with the laser light near the photo-sensitive body drum 131, a reflecting mirror 128, a cylindrical mirror 134 (corresponding to a third image formation optical system described below) for correcting a deflection relative to the direction (a direction of an auxiliary or slow scan) perpendicularly to a scanning direction (a direction of a main or fast scan) of the flux of laser light due to a so-called surface tilting of the rotating polygon mirror 126, a window 130 mounted for preventing dusts from entering into the box, a reflecting mirror 132 for detecting a position of the light, located immediately before the reflecting mirror 128 and within a region which is not used for recording on the end of a scanning start side, further for reflecting the flux of light in a predetermined direction, and a sensor 133 for detecting the position of the light, for photoelectrically converting the light reflected by the mirror 132, and for using as a synchronizing signal relative to an image signal.

As disclosed in Japanese Patent Application Laid-open No. 61-172109, sometimes the cylindrical mirror 134 for correcting the surface tilting on the rotating polygon mirror 126 may be replaced by an elongated cylindrical lens.

In the above conventional optical scanning apparatus, considering except for a plane mirror having no power, optical axes of all optical components are laid on the same surface, the flux of light proceeds on the optical axes of all the optical components with respect to the direction of the auxiliary scan, and a scanning line formed by the flux of light scanned by the optical deflector is a straight line, as shown in FIG. 2.

The curvature of field in the optical scanning apparatus disclosed in Japanese Patent Application Laid-open No. 6-18803 and Japanese Patent Application Laid-open No. 61-172109 will be explained with reference to FIG. 3 and FIG. 4. FIG. 3 shows the curvature of field when the cylindrical mirror (Japanese Patent Application Laid-open No. 6-18803) is used, and FIG. 4 shows the curvature of field (curvature of image surface) when the cylindrical lens (Japanese Patent Application Laid-open No. 61-172109) is used. In FIGS. 3 and 4, a vertical axis shows the scanning angle when the optical axis of the f θ lens is defined as 0°, a horizontal axis shows the position of the image formation when the surface to be scanned is defined as 0, the flux of light proceeds from the direction of minus to the direction of plus. In FIGS. 3 and 4, a dotted line shows the direction of the main scan and a solid line shows the direction of the auxiliary scan.

As shown in FIGS. 3 and 4, although the curvature of field in the direction of the main scan can be designed in such a manner that the curvature of field is not separated from the image surface, the image surface in the direction of the auxiliary scan is curved in the direction of minus, as the scanning angle becomes larger. When the cylindrical mirror is used as the third image formation optical system, the direction of the curvature can be pointed in the direction of either ± according to the construction of the f θ lens. However, when the cylindrical lens is used as the third image formation optical system, since the position of a focus is shifted in the direction of minus as the incident angle on the cylindrical lens is separated from the perpendicular direction, the direction of the curvature is always pointed in the direction of minus.

On one hand, the above third image formation optical system is called an optical system for correcting the surface tilting, and this optical system is constructed in such a manner that the reflecting surfaces of the optical deflector are conjugated with the surface to be scanned. However, practically, a conjugating point with the optical deflector is not laid on the surface to be scanned all over the range of the scan, and the conjugating point is moved frontward and rearward relative to the surface to be scanned according to the scanning position (referred to as the curvature of the conjugating point below).

However, in the conventional optical scanning apparatus, the following problems occur.

That is, when the above curvature is larger, a beam diameter varies in the direction of the auxiliary scan of the flux of laser light irradiated on the surface to be scanned, and further a shift of the scanning position (referred to as a pitch unevenness below) in the direction of the auxiliary scan due to the surface tilting of the optical deflector occurs or does not occur depending on the scanning position, thereby there is such a problem that the surface to be scanned cannot be evenly exposed.

In order to solve the above problem, in case of the optical system wherein the optical axes of the optical components are laid on the same plane surface, the following method is considered in order to reduce the curvature of field in the direction of the auxiliary scan or the curvature of the conjugating point. The third image formation optical system, that is, the cylindrical mirror or the cylindrical lens is disposed so that it approaches the surface to be scanned as close as possible. Usually, since the position where the cylindrical mirror or the cylindrical lens is disposed is limited to a layout within the image forming apparatus and the like which the optical scanning apparatus is mounted to, the cylindrical mirror or the cylindrical lens is not always disposed near the surface to be scanned. Further, if the cylindrical mirror or the cylindrical lens is approached to the surface to be scanned, a length of the cylindrical mirror or the cylindrical lens becomes longer, thereby there is another problem that a cost becomes higher.

SUMMARY OF THE INVENTION

The present invention takes consideration into the above facts and problems. It is an object of the present invention to provide an optical scanning apparatus in which when a cylindrical mirror or a cylindrical lens is used as an optical system for correcting a surface tilting of an optical deflector, a curvature of field in the direction of an auxiliary scan or a curvature of a conjugating point can be reduced without the cylindrical mirror or the cylindrical lens approaching to a surface to be scanned.

According to the first aspect of the present invention, an optical scanning apparatus comprises a first image formation optical system for shaping a diameter of a light beam emitted from a light source, thereby forming a linear image extending in the direction corresponding to the direction of a main scan, deflection means having reflecting surfaces at or near the position of the image formation of the linear image, for deflecting an incident light beam in the direction corresponding to the direction of the main scan at a constant angular velocity, a light transmissive second image formation optical system for forming the image with the light beam deflected by the deflection means on a surface to be scanned with respect to the direction of the main scan, and a third image formation optical system for forming the image with the light beam deflected by the deflection means on the surface to be scanned with respect to the direction of an auxiliary scan, having such a relationship that the reflecting surfaces are generally conjugated with the surface to be scanned, wherein a locational relationship between the first image formation optical system and the deflection means is set so that the light beam can be incident on the deflection means in such a manner that the center of a flux of light of the light beam from the light source forms a predetermined angle relative to an axis perpendicular to a rotating axis of the deflection means, and the third image formation optical system is disposed in such a manner that the distortion of the scanning line or the curved scanning line formed on the third image formation optical system due to the incidence of the light beam on the deflection means at the predetermined angle can correct the curvature of field in the direction of the auxiliary scan in a width of the scan on the surface to be scanned or the curvature of the conjugating point relative to the reflecting surfaces of the deflection means.

According to the first aspect of the present invention, the first image formation optical system firstly shapes the diameter of the light beam from the light source so that the linear image extending in the direction corresponding to the direction of the main scan can be formed on or near the reflecting surfaces of the deflection means. The deflection means deflects the incident light beam in the direction corresponding to the direction of the main scan at the constant angular velocity. The second image formation means, which is light transmissive, forms the image with the light beam deflected by the deflection means on the surface to be scanned regarding the direction of the main scan. The third image formation optical system forms the image with the light beam deflected by the deflection means on the surface to be scanned regarding the direction of the auxiliary scan, and further the reflecting surfaces are generally conjugated with the surface to be scanned. Since the light beam is incident on the deflection means so that the center of the flux of light of the light beam from the light source forms the predetermined angle relative to the axis perpendicular to the rotating axis of the deflection means, the scanning line formed on the third image formation optical system is curved. Since the third image formation optical system is disposed as described above, the distortion of the scanning line corrects the curvature of field regarding the direction of the auxiliary scan in the width of the scan on the surface to be scanned or the curvature of the conjugating point relative to the reflecting surfaces of the deflection means. Thus, by such simple construction, it is possible to reduce the curvature of field regarding the direction of the auxiliary scan in the width of the scan on the surface to be scanned or the curvature of the conjugating point relative to the reflecting surfaces of the deflection means.

According to the second aspect of the present invention, in the first aspect, the locational relationship between the first image formation optical system and the deflection means is set so that the light beam which is incident on the deflection means can be incident on the deflection means from a general center of a deflection angle.

According to the second aspect of the present invention, the light beam which is incident on the deflection means is incident on the deflection means from the general center of the deflection angle. That is, the so-called front incidence is carried out. The deflection angle means the angle formed by the deflection means and both ends of the scanning line formed along the direction of the main scan by the light beam deflected by the deflection means. By such location, the distortion of the scanning line which is incident on the third image formation optical system is symmetrical so that a correction effect of the curvature of the field regarding the direction of the auxiliary scan which is symmetrical relative to the center of the scan can be enhanced.

According to the third aspect of the present invention, in the first or second aspect, the third image formation optical system further comprises the cylindrical mirror, wherein a returning angle of the light beam returned by the cylindrical mirror is set so that the position of the image formation regarding the direction of the auxiliary scan or the conjugating point is disposed on or near the surface to be scanned all over the width of the scan defined by the deflection angle.

According to the third aspect of the present invention, since the returning angle of the light beam returned by the cylindrical mirror is set so that the image formation regarding the direction of the auxiliary scan or the conjugating point can be located on or near the surface to be scanned all over the width of the scan, the curvature can be corrected.

According to the fourth aspect of the present invention, in the first or second aspect, the third image formation optical system further comprises the cylindrical lens, wherein a height of the light beam which is incident on the cylindrical lens is shifted in the direction transversely to the line of the cylindrical lens so that the position of the image formation regarding the direction of the auxiliary scan or the conjugating point can be located on or near the surface to be scanned all over the width of the scan.

According to the fourth aspect of the present invention, since the height of the light beam which is incident on the cylindrical lens is shifted in the direction transversely to the center line perpendicular to the optical axis of the cylindrical lens and extending along the longitudinal direction thereof, the position of the image formation regarding the direction of the auxiliary scan or the conjugating point can be located on or near the surface to be scanned all over the width of the scan, thereby the curvature can be corrected.

According to the fifth aspect of the present invention, in the fourth aspect, the distance between the center line and the position where the light beam is incident on the center of the third image formation optical system along the scanning direction is longer than that between the center line and the position where the light beam is incident on the ends of the third image formation optical system along the scanning direction.

According to the sixth aspect of the present invention, in one of any aspects 1–5, the second image formation optical system is decentered and located so that the distortion of the scanning line formed on the third image formation optical system can be in a predetermined amount.

According to the sixth aspect of the present invention, since the second image formation optical system is decentered and located so that the distortion of the scanning line formed in the third image formation optical system can be in the predetermined amount, independently of a limitation of the layout, the distortion of the scanning line of the flux of light which is incident on the third image formation optical system can be easily increased and reduced. Thereby, further, a flexibility of the layout of each element is extended so that the curvature can be easily corrected.

DETAILED DESCRIPTION OF THE PREFERRED EMBODIMENTS

Embodiments according to the present invention will be explained below with reference to the accompanying drawings.

Embodiment 1

Figure 1:
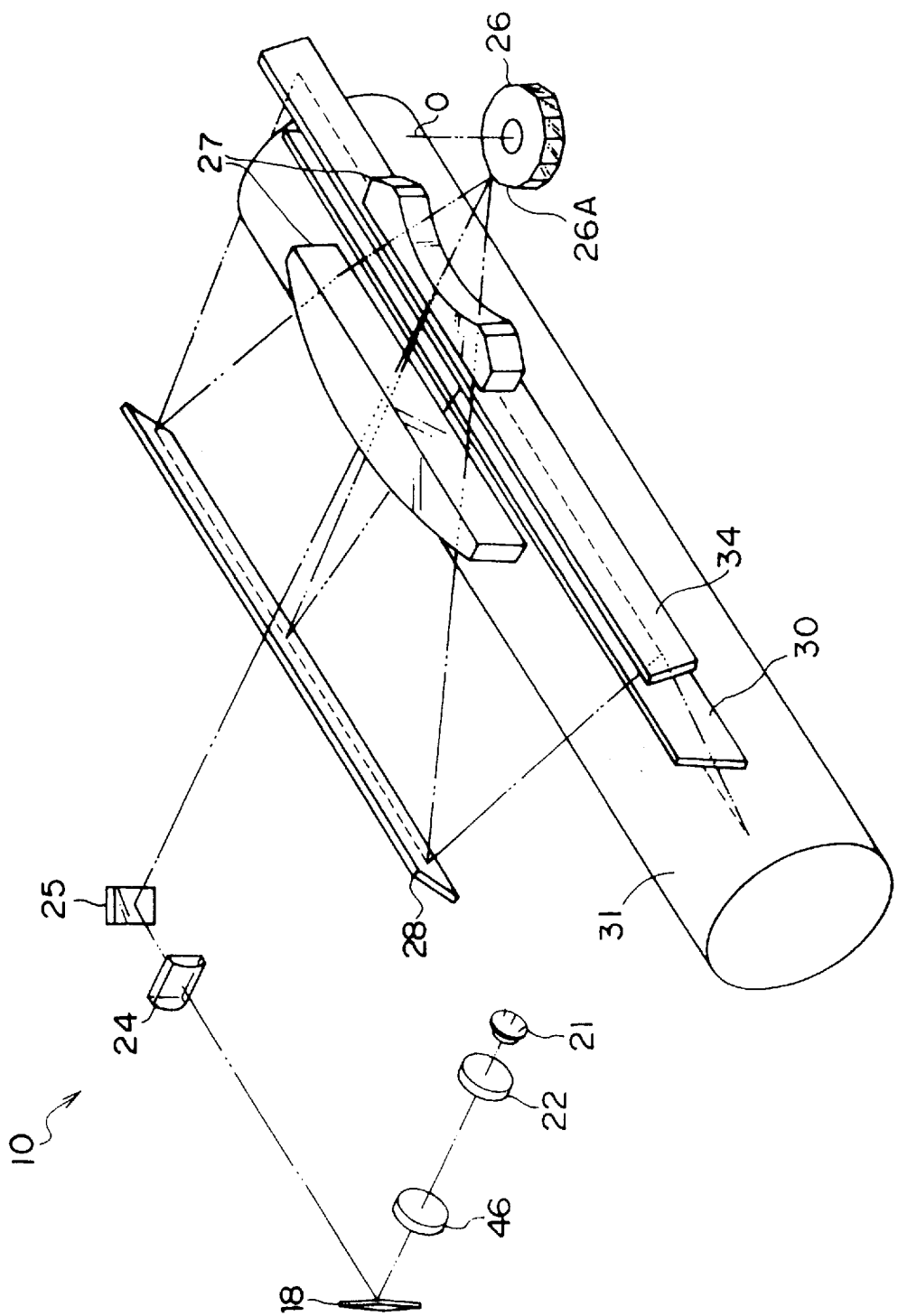
FIG. 1 shows a construction of an optical scanning apparatus according to the first embodiment of the present invention.
Figure 2:
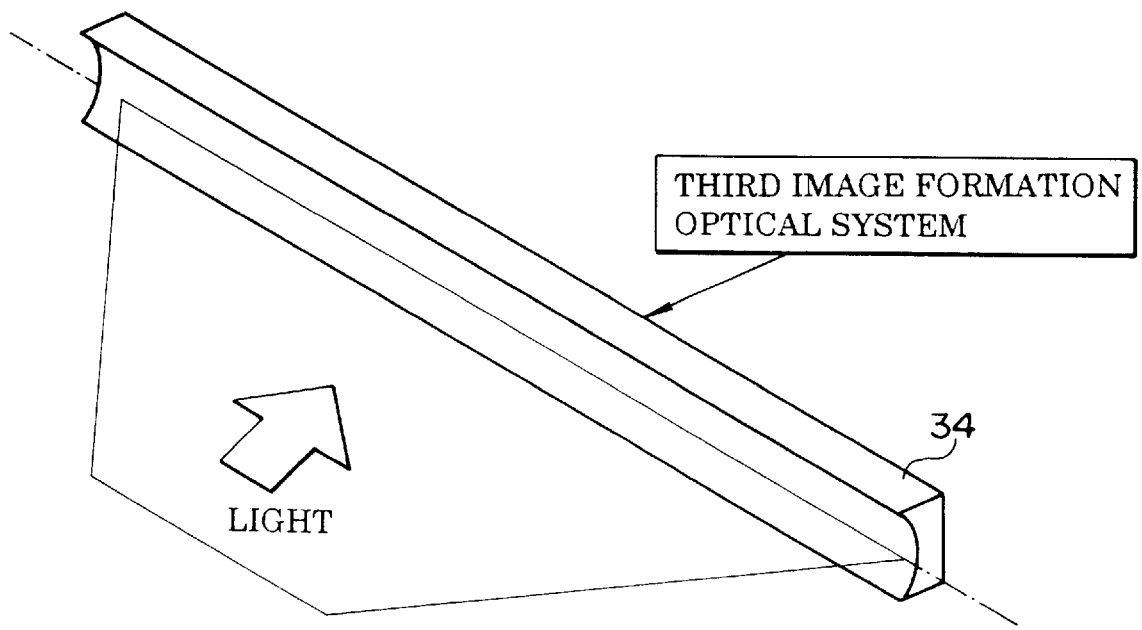
FIG. 2 shows a scanning line formed in a third image formation system.

In FIG. 1, an optical scanning apparatus 10 according to the first embodiment of the present invention is shown. At one end side of a box (not shown) in the optical scanning apparatus 10, a rotating polygon mirror 26 is disposed as deflection means of the present invention.

The rotating polygon mirror 26 is shaped as an equilateral polygonal square pillar, and a plurality of reflecting surfaces 26A are formed on its side surface. The rotating polygon mirror 26 is rotated around a rotating axis O extending along a vertical direction at a predetermined or constant angular velocity by drive means such as a motor (not shown) and the like. As the rotating polygon mirror 26 is rotated, the light beam which is incident on the reflecting surfaces 26A of the rotating polygon mirror 26 is reflected by the reflecting surfaces, simultaneously the light beam is deflect at the constant angular velocity. The direction in which the light beam is deflected by the rotating polygon mirror 26 is referred to as the direction of the main scan below, and the direction in which the light beam is transverse to the direction of the main scan is referred to as the direction of the auxiliary scan below.

As described below, the light beam is incident on the rotating polygon mirror 26 so as to form a predetermined angle relative to the axis perpendicular to the rotating axis O which the rotating polygon mirror 26 is rotated around.

On one hand, at the other end side of the box (not shown), a laser diode 21 (referred to as LD 21 below) is located as the light source of the present invention. A collimator lens 22 is disposed at the side where LD 21 emits the light beam. LD 21 is connected to a driver (not shown) so that LD 21 can be controlled to be turned on and off in response to an image signal by the driver. A first returning or folding mirror 18 is disposed at the side where the collimator lens 22 emits the light beam.

Further, at the position corresponding to the front of the rotating polygon mirror 26 on a light path of the light beam reflected by the first returning mirror 18 or, a middle portion of the scanning range along the main scan direction, a returning or folding mirror 25 is disposed (the so-called front incidence).

Furthermore, a cylindrical lens 24 (a first image formation optical system) is disposed between the first returning mirror 18 and the second returning mirror 25 as a rotating asymmetrical optical system. The cylindrical lens 24 focuses the light beam passed through the cylindrical lens 24 on or near the reflecting surfaces 26A only in the direction corresponding to the direction of the auxiliary scan, thereby a long linear image is formed so as to extend in the direction corresponding to the direction of the main scan.

The cylindrical lens 24 is mounted on a reference plane surface formed on a bottom portion of the box (not shown) (on a plane surface transverse to the rotating axis of the rotating polygon mirror 26, that is, a horizontal surface) so that the center line perpendicular to the optical axis of the cylindrical lens and extending along the longitudinal direction thereof can be pointed parallel to the reference plane surface and the optical axis of the light beam emitted from the first returning mirror 18 can be incident on the center line perpendicular to the optical axis of the cylindrical lens and extending along the longitudinal direction thereof. In this case, the first returning mirror 18 and the second returning mirror 25 are disposed such that the light beam reflected by the first returning mirror 18 is incident on a vertical reflecting surface of the second returning mirror 25 at an angle.

Furthermore, a spherical lens 46 having a negative power is disposed between the collimator lens 22 and the first returning mirror 18. After the light beam from emitted from LD 21 as a diverged light is collimated by the collimator lens 22, the collimated light beam is changed again to a diverged light by the spherical lens 46 in order to be incident on the first returning mirror 18.

Furthermore, an f θ lens 27 (the second image formation optical system, which is light transmissive) is disposed between the second returning mirror 25 and the rotating polygon mirror 26. The f θ lens 27 forms the image as a light spot on a periphery surface (the surface to be scanned) of a photo-sensitive body drum 31 described below with the light beam deflected at the constant angular velocity by the rotating polygon mirror 26, and further the f θ lens 27 corrects the light path so that the light spot can be scanned on the periphery surface of the photo-sensitive body drum 31 at the constant velocity.

The light beam reflected by the second returning mirror 25 is incident on the reflecting surfaces 26A of the rotating polygon mirror 26 so that the light beam is deflected by the rotating polygon mirror 26 which is rotating in order to be incident on the f θ lens 27. It may be constructed so that the light beam can be passed through the f θ lens 27 before the light beam is incident on the reflecting surfaces 26A. That is, the so-called double path is constructed so that the light beam can be passed through the f θ lens 27 twice, that is, once before the light beam is incident on the reflecting surfaces 26A and once after the light beam is reflected by the reflecting surfaces 26A. Of course, it may be so constructed that the light beam is passed through the f θ lens 27 only once after the light beam is reflected by the reflecting surfaces 26A.

Furthermore, a plane surface mirror 28 is disposed at the side where the light beam is emitted from the f θ lens 27. At the side where the light beam is emitted from the plane surface mirror 28, a cylindrical mirror 34 (the third image formation optical system) having a power only in the direction of the auxiliary scan for correcting the surface tilting of the rotating polygon mirror 26 is disposed.

Furthermore, at the side where the light beam is emitted from the cylindrical mirror 34, an opening is provided on the box (not shown) in order that the light beam can be passed through. A window 30 for preventing the dust from entering into the box is mounted to this opening portion. The light beam passed through the f θ lens 27 is reflected by the plane surface mirror 28, next, the light beam is reflected by the cylindrical mirror 34, so that the light beam passes through the window 30 in order to be emitted outward from the box.

Furthermore, the photo-sensitive body drum 31 is disposed at a lower portion of the optical scanning apparatus 10. The light beam passed through the window 30 is influenced by the f θ lens 27 described above, thereby the image is formed as the light spot on the periphery surface (the surface to be scanned) of the photo-sensitive body drum 31 and further the light beam is scanned on the periphery surface of the photo-sensitive body drum 31 at the constant speed. Note that a line formed by the light spot scanned on the surface to be scanned is called a scanning line. A driving force of the motor (not shown) is applied to the photo-sensitive body drum 31 in order to rotate the photo-sensitive body drum 31. The photo-sensitive body drum 31 is rotated, thereby the auxiliary scan can be carried out so that the image (a latent image) can be formed on the periphery surface of the photo-sensitive body drum 31.

Next, correction of the curvature of field or the curvature of the conjugating point of the optical scanning apparatus according to the first embodiment of the present invention will be explained below.

Firstly, when the incidence of the flux of light on the rotating polygon mirror 26 is inclined in the direction of the, auxiliary scan, the distortion of the scanning line formed on the surface to be scanned occurs in the direction of the auxiliary scan. This will be explained with reference to FIG. 5.

Figure 5:
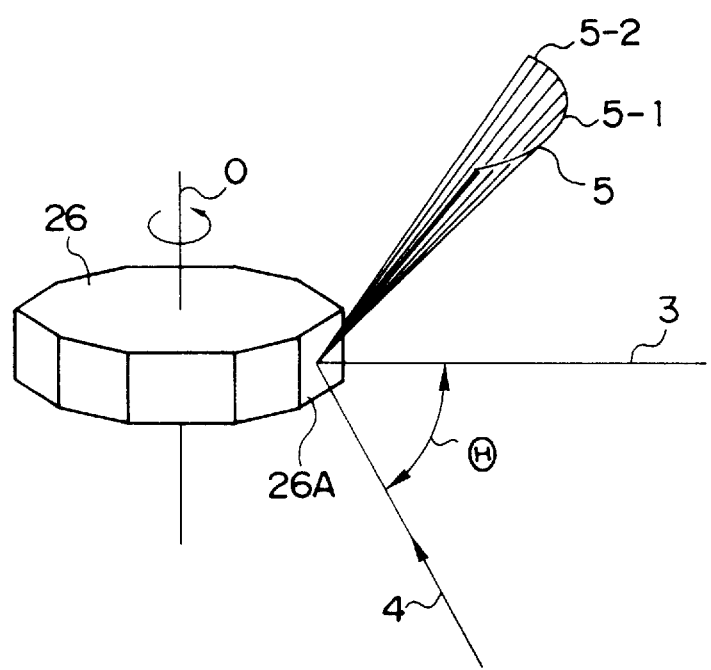
FIG. 5 shows a flux of light which is incident on a rotating polygon mirror and deflected fluxes of light.

As shown in FIG. 5, when an incident flux of light 4 from LD 21 is incident on the deflecting (reflecting) surface 26A of the rotating polygon mirror 26 in such a manner that a finite angle H is formed relative to a surface crossing the rotating axis O and the deflecting surface 26A, a deflected flux of light 5 draws a locus shown by deflected fluxes of light 5-1 and 5-2. In FIG. 5, a cross section 3 shows a surface transversely crossing across both of the rotating axis O and the deflecting surface 26A.

Figure 6A:
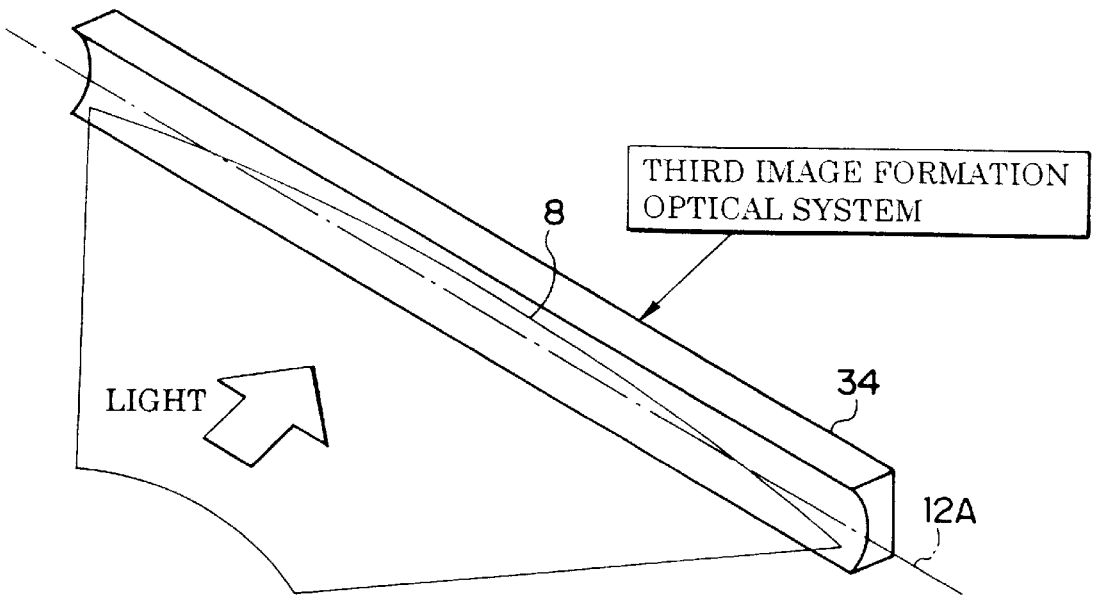
FIG. 6A shows a condition that a scanning line formed in the third image formation optical system is curved, and is a perspective view of the third image formation optical system and the distortion of the scanning line formed on the third image formation optical system.

Thus, since the deflected flux of light draws the locus as shown in FIG. 5, the distortion or curvature occurs in a scanning line 8 of the flux of laser light which is incident on the cylindrical mirror 34 constructed as the third image formation optical system, as shown in FIG. 6A (see Japanese Patent Application Laid-open No. 53-31147).

Figure 6B:
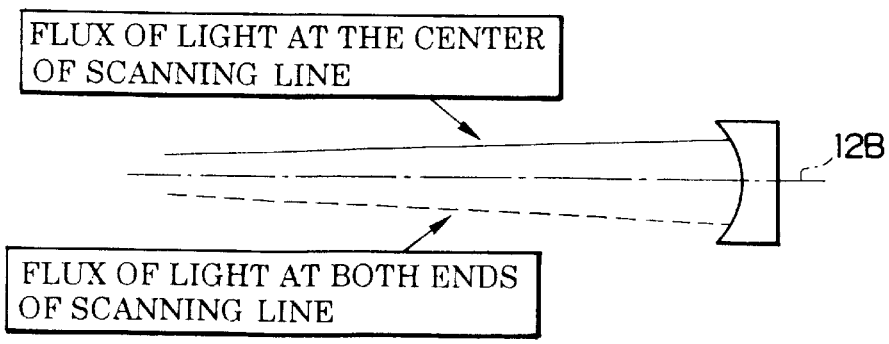
FIG. 6B shows a condition that the scanning line formed in the third image formation optical system is curved, and shows the distortion of the flux of light which is incident on the third image formation optical system in viewing from the direction of the line perpendicular to the optical axis of the third image formation optical system and extending along the longitudinal direction thereof.

FIG. 6B shows the third image formation optical system in FIG. 6A in viewing from the direction of a line 12A perpendicular to the optical axis of the mirror 34 and extending in the longitudinal direction thereof. The flux of light irradiating the center of the width of the scan on the surface to be scanned is shown by the solid line, and the flux of light irradiating the end of the width of the scan is shown by the dotted line. As shown in FIGS. 6A and 6B, at the center of the scanning line, a deviation of the scanning line 8 from the line 12A becomes maximum in the direction of plus (the direction upper from the line 12A), the deviation is reduced as the scanning line approaches to the end of the scanning line, and at the end of the scan, the deviation from the line 12A becomes maximum in the direction of minus.

According to the first embodiment, on the contrary, the distortion of the scanning line 8 is used, and the rotating polygon mirror 26, the cylindrical mirror 34 and the photosensitive body drum 31 are appropriately disposed, thereby the curvature of field or the curvature of the conjugating point can be corrected. A principle of the correction will be explained below with reference to FIG. 7. According to the first embodiment, regarding such a case that the cylindrical mirror 34 is used as the third image formation optical system, the correction is explained.

Figure 7A:
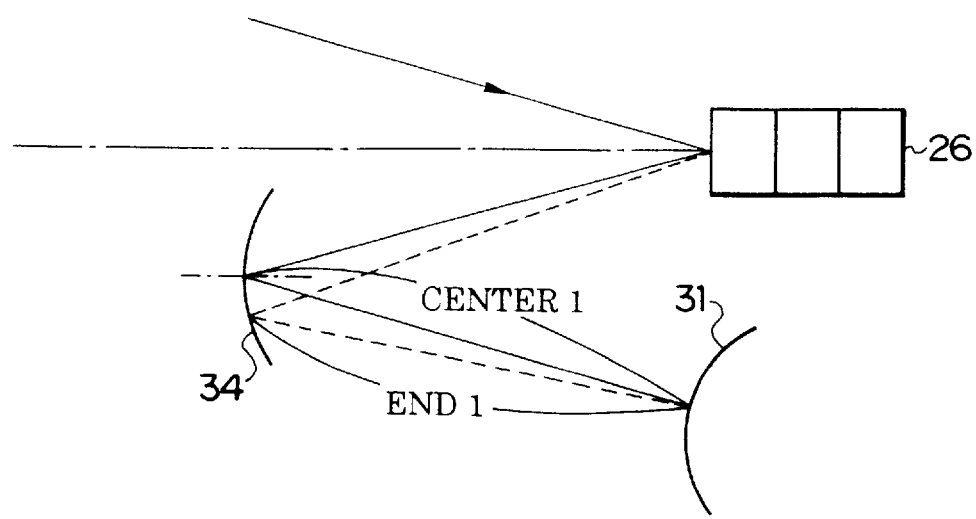
FIG. 7A illustrates a returning angle of the flux of light effected by a cylindrical mirror of the optical scanning apparatus according to the first embodiment of the present invention, and is an arrangement diagram of each element when a reflected flux of light of the cylindrical mirror does not cross an incident flux of light on an optical deflector.
Figure 7B:
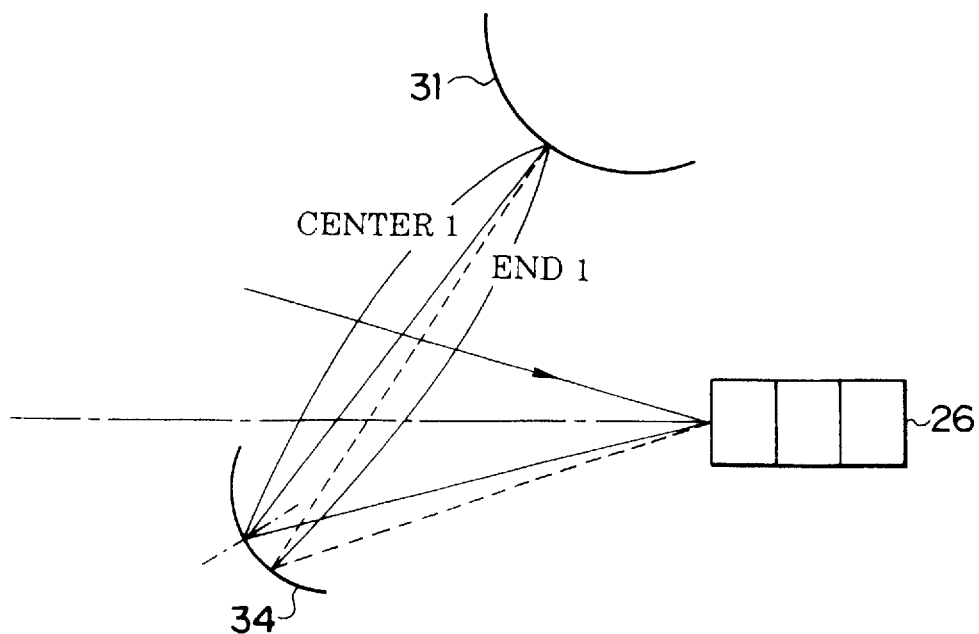
FIG. 7B illustrates the returning angle of the flux of light effected by the cylindrical mirror of the optical scanning apparatus according to the first embodiment of the present invention, and is an arrangement diagram of each element when a reflected flux of light of the cylindrical mirror crosses the incident flux of light on the optical deflector.

In FIGS. 7A and 7B, similarly to FIG. 6B, show the third image formation optical system in viewing from the direction perpendicular to the optical axis of the mirror 34, each example of the arrangement having different returning angles is shown, respectively. Note that the returning angle means the angle formed between the flux of light which is incident on the cylindrical mirror 34 and the flux of light reflected by the cylindrical mirror 34. In FIGS. 7A and 7B, the plane surface mirror 28 is omitted.

Even if the cylindrical mirror 34, the photo-sensitive body drum 31, etc. are relocated from the returning angle shown in FIG. 7A to the returning angle shown in FIG. 7B, although a distance between the cylindrical mirror 34 and the surface to be scanned of the photo-sensitive body drum 31 at the center of the scan (referred to as "center 1" below) is not changed, the distance between the cylindrical mirror 34 and the surface to be scanned at the end of the scan (referred to as "end 1" below) is changed according to the returning angle.

When the light beam is returned as shown in FIG. 7A, since the end 1 becomes shorter, the position of the image formation or the conjugating point of the end of the scanning line is moved in the direction of plus relative to the surface to be scanned. Since the center 1 is not changed, the position of the image formation or the curvature of the conjugating point at the center of the scan is not moved. As a result, the curvature of field in the direction of the auxiliary scan or the curvature of the conjugating point is changed in the direction of plus. Accordingly, if this returning method is applied to such optical scanning apparatus, etc. that the image surface in the direction of the auxiliary scan is changed in the direction of minus as the scanning angle becomes larger as shown in FIG. 3, it is possible to reduce the curvature of field in the direction of the auxiliary scan which is conventionally curved in the direction of minus or the conjugating point.

Figure 3:
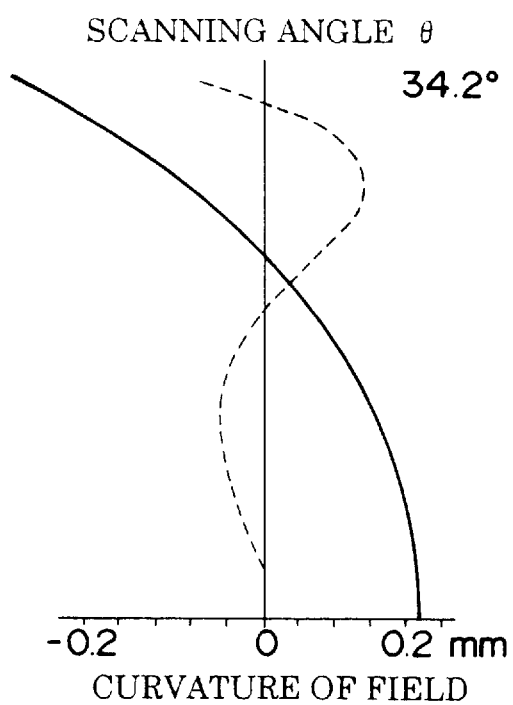
FIG. 3 shows a curvature of field on a surface to be scanned.

Furthermore, contrary to FIG. 3, in case of such a system that the image surface in the direction of the auxiliary scan is changed in the direction of plus as the scanning angle becomes larger, when the light beam is returned as shown in FIG. 7B, since the behavior opposite to the above behavior is revealed, it is possible to reduce the curvature of field in the direction of the auxiliary scan or the conjugating point, similarly. In FIG. 7, although the flux of light at the center of the scan is incident on the line 12A of the cylindrical mirror 34, since the length of the center 1 and the end 1 can be changed even if the flux of light is not incident on the line 12A, the similar effect can be obtained.

Embodiment 2

According to the first embodiment, the correction of the curvature is explained in case of the cylindrical mirror 34 used as the third image formation optical system. Even if the cylindrical lens is used as the optical system for correcting the surface tilting, the curvature can be also corrected, similarly. This case will be explained as the second embodiment below. In the construction of the optical scanning apparatus according to the second embodiment, the cylindrical mirror 34 is replaced by the cylindrical lens 35 (see FIGS. 8A, 8B and 8C), and since other elements of the second embodiment is substantially similar to that of the first embodiment, the same elements have the same reference numerals. Accordingly, an explanation is omitted.

According to the second embodiment, the height of the light beam which is incident on the cylindrical lens 35 (the distance between the light beam which is incident on the cylindrical lens 35 and the optical axis) is adjusted so that the curvature of field or the curvature of the conjugating point can be corrected. This principle of the correction will be explained with reference to FIGS. 8A, 8B and 8C.

Figure 4:
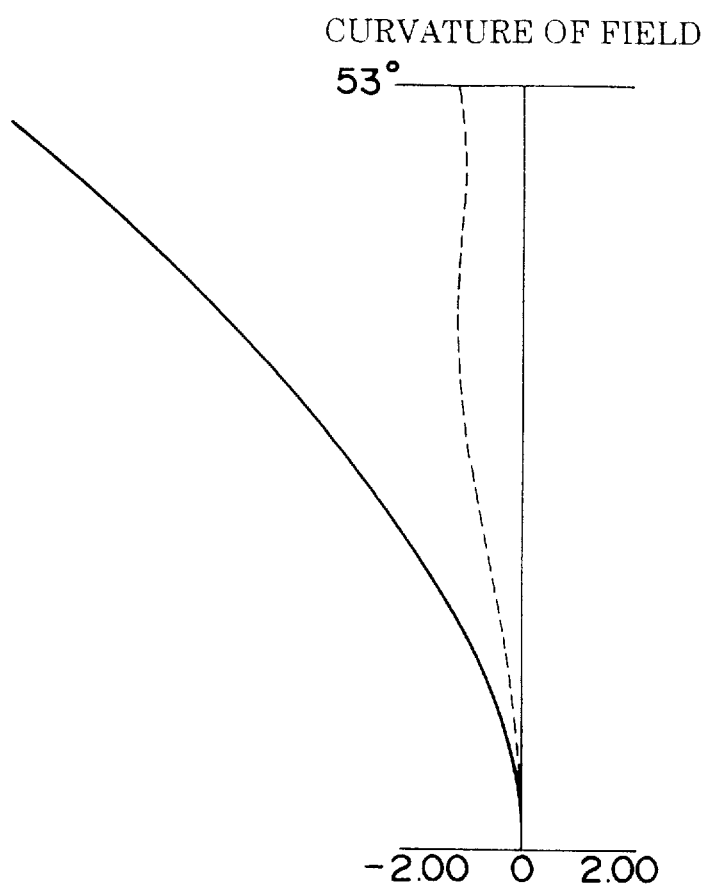
FIG. 4 shows a curvature of field on a surface to be scanned.
Figure 8A:
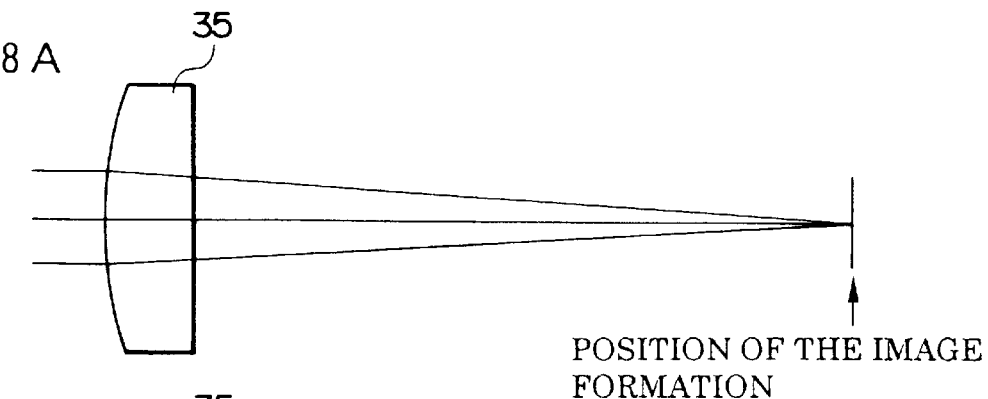
FIG. 8A shows a relationship between a height of the incident flux of light on the cylindrical lens and the position of the image formation near the surface to be scanned of the optical scanning apparatus according to the second embodiment of the present invention, and shows the position of the image formation when the incident flux of light is symmetric about an optical axis of the lens.
Figure 8B:
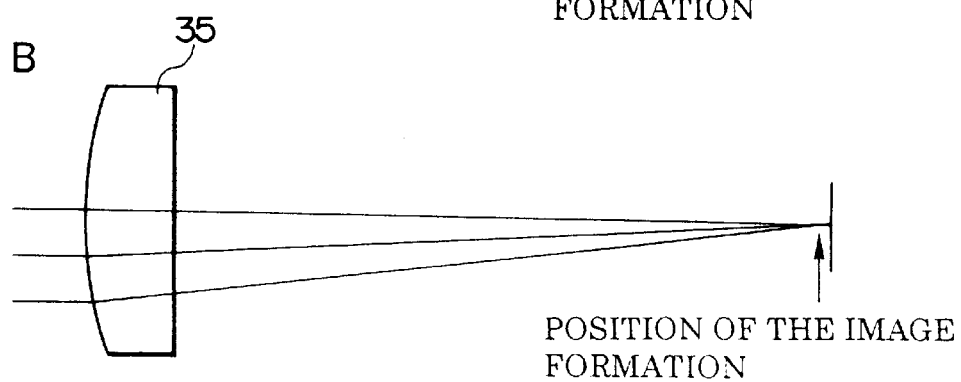
FIG. 8B shows a relationship between the height of the incident flux of light on the cylindrical lens and the position of the image formation near the surface to be scanned of the optical scanning apparatus according to the second embodiment of the present invention, and shows the position of the image formation when the incident flux of light is shifted by a predetermined height relative to an optical axis of the lens.
Figure 8C:
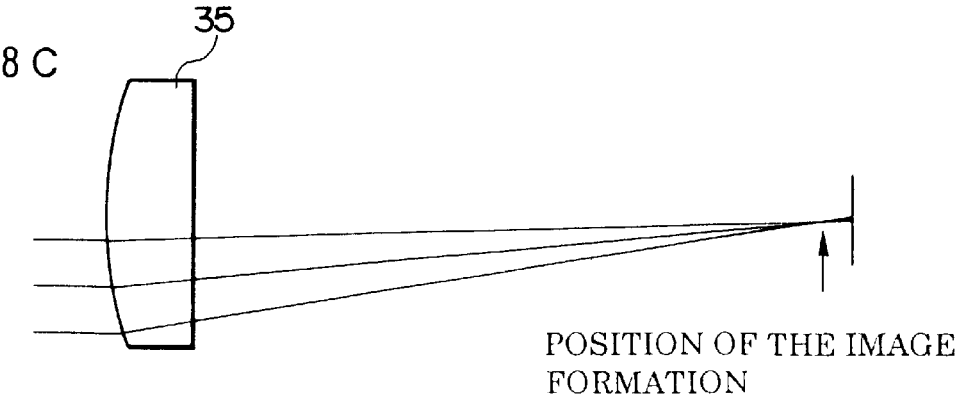
FIG. 8C shows a relationship between the height of the incident flux of light on the cylindrical lens and the position of the image formation near the surface to be scanned of the optical scanning apparatus according to the second embodiment of the present invention, and shows the position of the image formation when the height relative to the optical axis of the incident flux of light is further shifted, compared to the case shown in FIG. 8B.

In FIGS. 8A, 8B and 8C, the variation of the positions of the image formation on the surface to be scanned is shown when the height of the light beam which is incident on the cylindrical lens 35 is changed, respectively. As shown in FIGS. 8A, 8B and 8C, as the incident height of the beam is gradually separated from the optical axis of the lens 35, the position of the image formation is moved from the surface to be scanned to the cylindrical lens. Accordingly, similarly to the first embodiment, the scanning line 8 which is incident on the third image formation system is curved, thereby the positions of the image formations at the center and end of the scan can be different from each other. For example, when the flux of light at the end of the scanning line is incident on the line perpendicular to the optical axis of the cylindrical lens and extending in the longitudinal direction thereof and the flux of light at the center of the scanning line is incident on the position separated from the line, the image surface in the direction of the auxiliary scanning is moved in the direction of plus as the scanning angle becomes larger. If this construction is applied to the optical system where the cylindrical lens is used as the third image formation optical system as shown in FIG. 4, the curvature of field in the direction of the auxiliary scan which is conventionally curved in the direction of minus is offset to each other, thereby the curvature of field or the curvature of the conjugating point can be reduced. According to the above explanation, although the flux of light at the end of the scan is incident on the line of the cylindrical lens, even if the whole scanning line is separated from the line perpendicular to the optical axis of the cylindrical lens and extending in the longitudinal direction thereof, the similar effect can be obtained.

Usually, in many cases, the curvature of field in the direction of the auxiliary scan is substantially symmetric relative to the center of the scan. Accordingly, in many cases, the deflection of the scanning line of the flux of light which is incident on the third image formation optical system is symmetrical. As shown in FIG. 1, when the flux of light is incident on the optical deflector from the side relative to the direction of the main scan, the deflection of the scanning line is not symmetrical. In order that the deflection of the scanning line is symmetrical, it is necessary that the flux of light is incident on the optical deflector from the center of the scan relative to the direction of the main scan (referred as to "front incidence" below).

As the conventional optical system, in case that the optical system is formed on the same plane surface, when the front incidence is carried out, since the incident flux of light and the flux of light deflected by the optical deflector are overlapped on each other, except when a particular optical component such as a beam splitter is not added to the optical system, the optical system cannot be mounted to the apparatus. However, in case of the present invention, as shown by the angle H in FIG. 5, since the angle is formed in the direction of the auxiliary scan, the incident flux of light on the optical deflector and the deflected flux of light are not overlapped on each other, thereby the optical system can be mounted to the apparatus.

As a secondary effect of the front incidence, when the front incidence is carried out relative to the optical deflector, since the width of the flux of light projected on the reflecting surfaces of the optical deflector becomes minimum, the width of each reflecting surface or facet necessary for the rotating polygon mirror becomes minimum so that the diameter of the rotating polygon mirror can be reduced or the number of facets of the rotating polygon mirror can be increased. Thereby, such effect that a load applied to the motor for driving the optical deflector can be reduced can be obtained.

Furthermore, when the so-called overfilled optical system as disclosed in Japanese Patent Application Laid-open No. 6-315091 is applied to this optical system, since the variation of an F-number becomes symmetrical, the beam diameter in the direction of the main scan and a distribution of an exposure energy becomes symmetrical so that unevenness of the beam diameter in the direction of the main scan and the distribution of the exposure energy peculiar to the overfilled optical system can be minimum.

As described above, the scanning line formed by the flux of light which is incident on the third image formation optical system is curved so that the returning angle effected by the cylindrical mirror or the height of the incident light beam on the cylindrical lens can be appropriately set, thereby the curvature of field in the direction of the auxiliary scan or the curvature of the conjugating point can be corrected.

According to the first and second embodiments, in order to mount and design the above construction, the importance is that an appropriate combination of three conditions, that is, the curvature intrinsically included in the optical system as the conventional examples, an amount of the distortion of the scanning line which is incident on the third image formation optical system, and either the returning angle effected by the cylindrical mirror or the height of the incident light on the cylindrical lens enables to correct the curvature of field or the curvature of the conjugating point.

Embodiment 3

According to the above embodiments, since the position where the third image formation optical system is disposed is limited to the layout in the image forming apparatus which the optical scanning apparatus is mounted to, sometimes the returning angle effected by the cylindrical mirror or the height of the incident light on the cylindrical lens cannot be appropriately set. Further, the amount of the distortion of the scanning line which is incident on the third image formation optical system can be changed according to the incident angle (shown by the angle H in FIG. 5) on the optical deflector in the direction of the auxiliary scan. However, since the locations of almost all the optical components forming the optical system are changed by this change, a configuration of the box for accommodating the optical components is much influenced.

According to the third embodiment, as the method for easily reducing the distortion of the scanning line of the flux of light which is incident on the third image formation optical system independently of the layout, the method for decentering and locating the second image formation optical system which the flux of light scanned by the optical deflector is incident on will be disclosed below. The elements similar to the above embodiments have the same reference numerals, and the explanation is omitted.

Figure 9A:
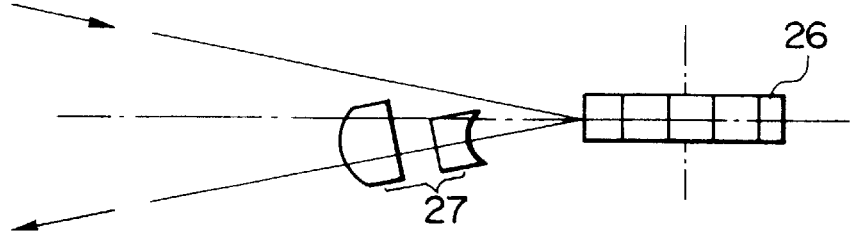
FIG. 9A shows an example of the arrangement of an f θ lens of the optical scanning apparatus according to the third embodiment of the present invention, and shows the arrangement when the f θ lens has a curvature in the direction of the auxiliary scan.

Examples of the decentering of the second image formation optical system are shown in FIGS. 9A–9D. In the example of FIG. 9A, the f θ lens 27 is decentered and disposed in such a manner that the flux of light reflected by the rotating polygon mirror 26 can pass at the height spaced by a predetermined distance from the optical axis of the f θ lens 27 used as the second image formation optical system, having the curvature in the direction of the auxiliary scan.

Figure 9B:
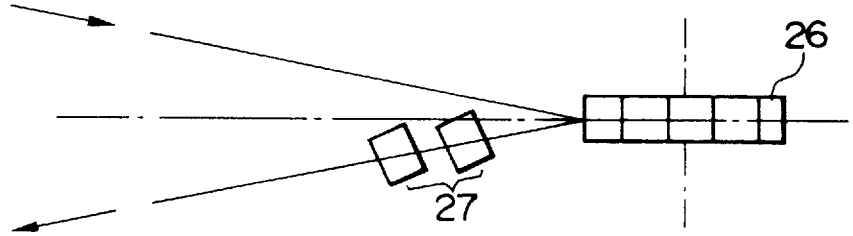
FIG. 9B shows an example of the arrangement of the f θ lens of the optical scanning apparatus according to the third embodiment of the present invention, and shows the arrangement when the reflected flux of light forms a finite angle relative to the optical axis of the f θ lens.

Furthermore, in the example of FIG. 9B, the f θ lens 27 is inclined and disposed so that the flux of light reflected by the rotating polygon mirror forms the finite angle relative to the optical axis of the f θ lens 27.

Figure 9C:
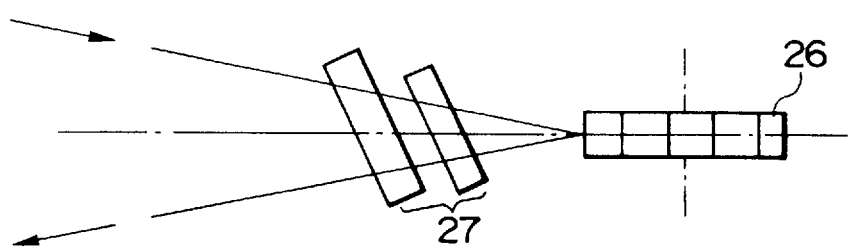
FIG. 9C shows an example of the arrangement of the f θ lens of the optical scanning apparatus according to the third embodiment of the present invention, and shows the arrangement when the reflected flux of light passes through the f θ lens twice.

Furthermore, in the example of FIG. 9C, similarly to the example of FIG. 9B, although the f θ lens 27 is inclined relative to the reflected flux of light and disposed, it is so constructed that the flux of light which is incident on the optical deflector and the flux of light reflected and deflected by the optical deflector pass through the f θ lens 27. This construction is called the so-called double path.

In the optical system shown in FIGS. 9A and 9B, it is necessary to set the incident angle relative to the optical deflector in the direction of the auxiliary scan (shown by the angle H in FIG. 5) to a larger value so that the flux of light which is incident on the optical deflector does not interfere with the f θ lens used as the second image formation optical system. However, when the angle H is larger, the distortion of the scanning line on the surface to be scanned becomes larger beyond an allowable range, and the beam diameter at the position of the image formation of the end of the scan, that is, a diameter of a beam waist becomes larger. The above problems occur.

On the other hand, in the construction of the double path shown in FIG. 9C, since the flux of light which is incident on the optical deflector does not need to avoid the f θ lens, the advantage that a selection of the angle H can be more flexible can be obtained.

Figure 9D:
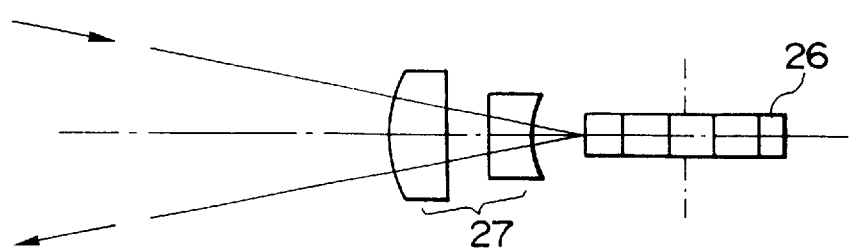
FIG. 9D shows an example of the arrangement of the f θ lens of the optical scanning apparatus according to the third embodiment of the present invention, and shows the arrangement when a normal of the reflecting surface of the optical deflector corresponds to the optical axis of the f θ lens.
Figure 10:
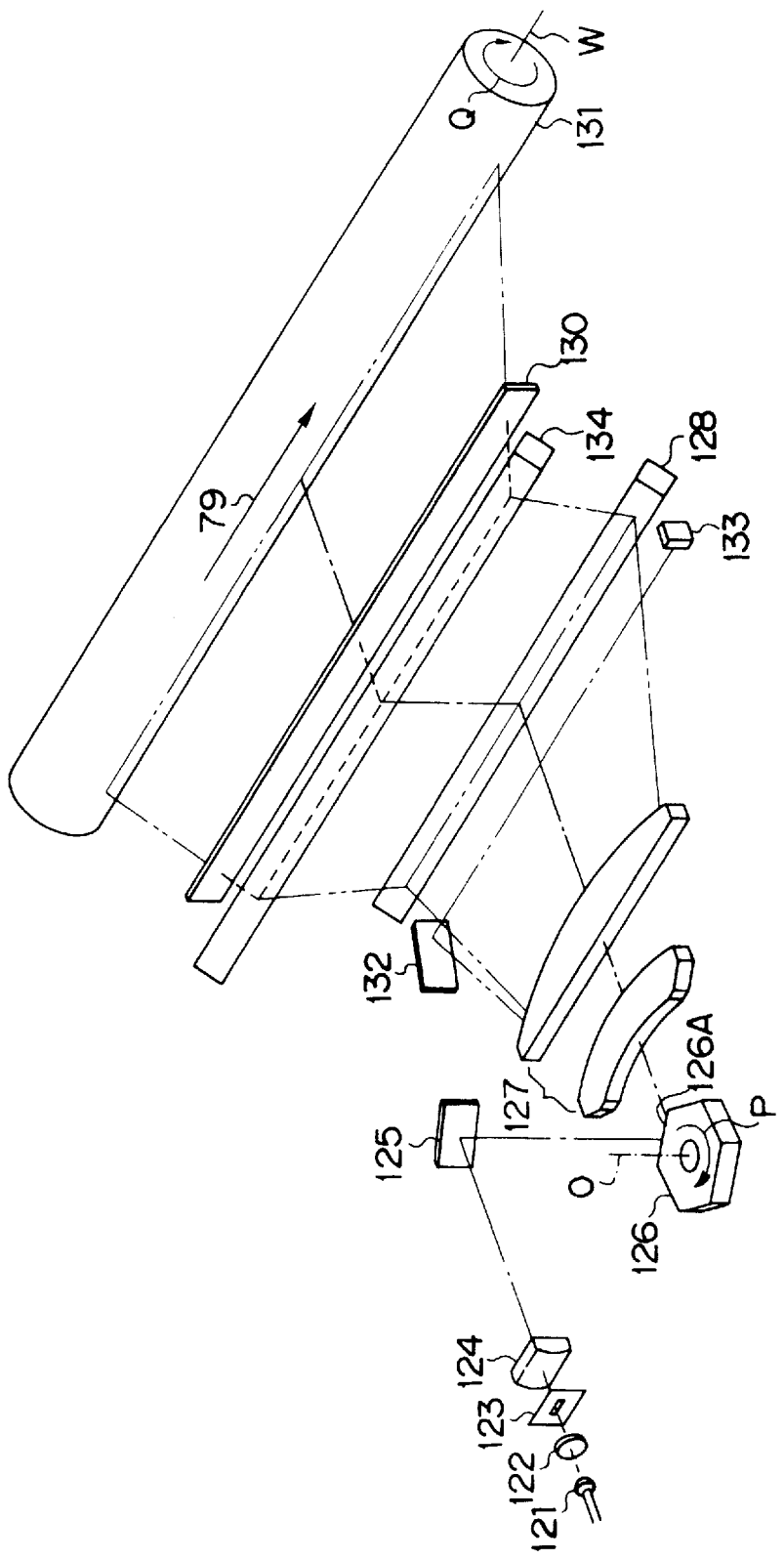
FIG. 10 shows a construction of a conventional optical scanning apparatus.

Further, in the example of FIG. 9D, the normal on the reflecting surface of the optical deflector and the optical axis of the f θ lens are disposed so that they correspond to each other. If the method for decentering the image formation optical system is the method for changing the distortion or curvature of the scanning line of the flux of light which is incident on the f θ lens, the method for decentering is not limited to the above description.

What is claimed is:

1. An optical scanning apparatus comprising:

a first image formation optical system for shaping a diameter of a light beam emitted from a light source, thereby forming a long linear image extending in the direction corresponding to the direction of a main scan;

deflection means having reflecting surfaces at or near the position of the image formation of said linear image, for deflecting an incident light beam in the direction corresponding to the direction of the main scan at a constant angular velocity;

a light transmissive second image formation optical system for forming the image with the light beam deflected by said deflection means on a surface to be scanned with respect to the direction of the main scan; and a third image formation optical system for forming the image with the light beam deflected by said deflection means on said surface to be scanned with respect to the direction of an auxiliary scan, having such a relationship that said reflecting surfaces are generally conjugated with said surface to be scanned, wherein a locational relationship between said first image formation optical system and said deflection means is set so that said light beam can be incident on said deflection means in such a manner that the center of a flux of light of the light beam from said light source forms a predetermined angle relative to an axis perpendicular to a rotating axis of said deflection means, and said third image formation optical system is disposed in such a manner that the distortion of the scanning line formed on the third image formation optical system due to the incidence of the light beam on the deflection means at the predetermined angle can correct the curvature of field in the direction of the auxiliary scan in a width of the scan on said surface to be scanned or the curvature of the conjugating point relative to the reflecting surfaces of said deflection means.

2. The optical scanning apparatus according to claim 1, wherein the locational relationship between said first image formation optical system and said deflection means is set so that the light beam which is incident on said deflection means can be incident on said deflection means from a general center of a deflection angle.

3. The optical scanning apparatus according to claim 2, wherein said third image formation optical system further comprising:

a cylindrical mirror, wherein a returning angle of the light beam returned by said cylindrical mirror is set so that the position of the image formation in the direction of the auxiliary scan or the conjugating point can be disposed on or near said surface to be scanned all over the width of the scan.

4. The optical scanning apparatus according to claim 3, wherein said second image formation optical system is decentered and disposed so that the distortion of the scanning line formed on said third image formation optical system can be in a predetermined amount.

5. The optical scanning apparatus according to claim 2, wherein said third image formation optical system further comprising:

a cylindrical lens, wherein a height of the light beam which is incident on said cylindrical lens is shifted in the direction transversely to a center line perpendicular to the optical axis of the cylindrical lens and extending along the longitudinal direction of said cylindrical lens so that the position of the image formation regarding the direction of the auxiliary scan or the conjugating point can be located on or near said surface to be scanned all over the width of the scan.

6. The optical scanning apparatus according to claim 5, wherein the distance between said center line and the position where the light beam is incident on the center of said third image formation optical system along the scanning direction is longer than that between said center line and the position where the light beam is incident on the ends of said third image formation optical system along the scanning direction.

7. The optical scanning apparatus according to claim 6, wherein said second image formation optical system is decentered and disposed so that the distortion of the scanning line formed on said third image formation optical system can be in a predetermined amount.

8. The optical scanning apparatus according to claim 5, wherein said second image formation optical system is decentered and disposed so that the distortion of the scanning line formed on said third image formation optical system can be in a predetermined amount.

9. The optical scanning apparatus according to claim 2, wherein said second image formation optical system is decentered and disposed so that the distortion of the scanning line formed on said third image formation optical system can be in a predetermined amount.

10. The optical scanning apparatus according to claim 1, wherein said third image formation optical system further comprising:

a cylindrical mirror, wherein a returning angle of the light beam returned by said cylindrical mirror is set so that the position of the image formation in the direction of the auxiliary scan or the conjugating point is disposed on or near said surface to be scanned all over the width of the scan.

11. The optical scanning apparatus according to claim 10, wherein said second image formation optical system is decentered and disposed so that the distortion of the scanning line formed on said third image formation optical system can be in a predetermined amount.

12. The optical scanning apparatus according to claim 1, wherein said third image formation optical system further comprising:

a cylindrical lens, wherein a height of the light beam which is incident on said cylindrical lens is shifted in the direction transversely to a center line perpendicular to the optical axis of the cylindrical lens and extending along the longitudinal direction of said cylindrical lens so that the position of the image formation regarding the direction of the auxiliary scan or the conjugating point can be located on or near said surface to be scanned all over the width of the scan.

13. The optical scanning apparatus according to claim 12, wherein the distance between said center line and the position where the light beam is incident on the center of said third image formation optical system along the scanning direction is longer than that between said center line and the position where the light beam is incident on the ends of said third image formation optical system along the scanning direction.

14. The optical scanning apparatus according to claim 13, wherein said second image formation optical system is decentered and disposed so that the distortion of the scanning line formed on said third image formation optical system can be in a predetermined amount.

15. The optical scanning apparatus according to claim 12, wherein said second image formation optical system is decentered and disposed so that the distortion of the scanning line formed on said third image formation optical system can be in a predetermined amount.

16. The optical scanning apparatus according to claim 1, wherein said second image formation optical system is decentered and disposed so that the distortion of the scanning line formed on said third image formation optical system can be in a predetermined amount.

* * * * *